(12) United States Patent
Takakura

(10) Patent No.: US 7,170,569 B2
(45) Date of Patent: Jan. 30, 2007

(54) LIQUID CRYSTAL SHUTTER AND PRINTHEAD

(75) Inventor: Toshihiko Takakura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 315 days.

(21) Appl. No.: 10/787,069

(22) Filed: Feb. 24, 2004

(65) Prior Publication Data

US 2004/0207782 A1 Oct. 21, 2004

(30) Foreign Application Priority Data

Mar. 5, 2003 (JP) .............................. 2003-057905

(51) Int. Cl.
*G02F 1/13* (2006.01)
(52) U.S. Cl. ............................................. 349/3; 349/2
(58) Field of Classification Search ................ 349/2–4
See application file for complete search history.

(56) References Cited

U.S. PATENT DOCUMENTS

| | | | |
|---|---|---|---|
| 4,589,732 A * | 5/1986 | Shiraishi et al. ................ 349/3 |
| 4,653,862 A * | 3/1987 | Morozumi ................... 349/109 |
| 4,671,642 A * | 6/1987 | Ohkubo et al. ................ 399/7 |
| 4,907,859 A * | 3/1990 | Takada et al. ............... 349/161 |
| 5,130,830 A * | 7/1992 | Fukushima et al. .......... 349/123 |
| 5,384,649 A * | 1/1995 | Takimoto et al. .............. 349/25 |
| 5,797,050 A * | 8/1998 | Smith .......................... 396/241 |
| 6,281,923 B1 | 8/2001 | Yamada et al. |
| 2003/0147028 A1* | 8/2003 | Furuki et al. ................ 349/110 |
| 2004/0201787 A1* | 10/2004 | Sekiguchi et al. ............. 349/16 |

FOREIGN PATENT DOCUMENTS

JP 2000-280527 10/2000

* cited by examiner

*Primary Examiner*—Stephen Meier
*Assistant Examiner*—Han Samuel Choi
(74) *Attorney, Agent, or Firm*—Hamre, Schumann, Mueller & Larson, P.C.

(57) ABSTRACT

The present invention relates to a liquid crystal shutter (5). The liquid crystal shutter (5) includes a first and a second transparent substrates (50), (51) arranged to face each other; a light shielding film (52) formed on a surface (511) of the second transparent substrate (51), which faces the first transparent substrate (50), for restricting incidence of light travelling from the first transparent substrate (50) to the second transparent substrate (51); and transparent electrodes (54b) laminated over the light shielding film (52). The transparent electrodes (54b) are laminated over the light shielding film (52) via a single insulating layer (53b). Each of the transparent electrodes (54b), the light shielding film (52) and the insulating layer (53b) is made of an inorganic substance.

10 Claims, 8 Drawing Sheets

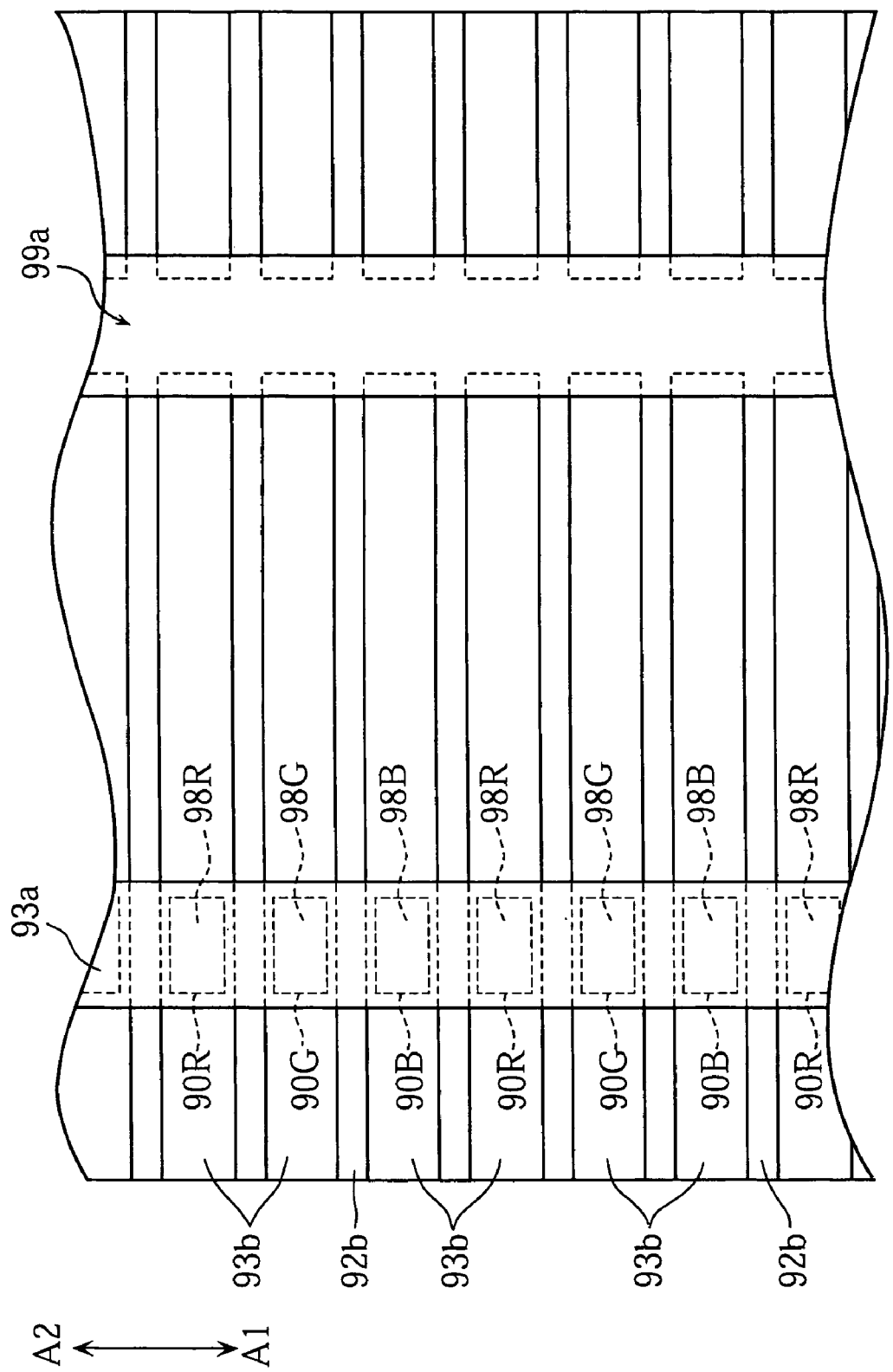

LIQUID CRYSTAL SHUTTER AND PRINTHEAD

BACKGROUND OF THE INVENTION

1. Field of the Invention

The present invention relates to a liquid crystal shutter, and a printhead provided with a liquid crystal shutter.

2. Description of the Related Art

An electronic image captured by a digital camera, for example, can be printed on an ordinary paper based on the digital data by inkjet or thermal transfer. It is also conceivable to print an image as digital data on a photosensitive film by a photosensitive system. In the photosensitive system, an image is formed on a photosensitive film by exposing the photosensitive film to light followed by developing the film using a photo printhead. A typical photo printhead is provided with a liquid crystal shutter for selectively passing or blocking light travelling from an illuminator, for example (See JP-A-2000-280527, for example).

FIGS. 7 and 8 show an example of liquid crystal shutter. The liquid crystal shutter 9 shown in the figures includes a plurality of individual shutter portions 90R, 90G, 90B aligned in the primary scanning direction (the direction indicated by arrows A1, A2 in the figure). The liquid crystal shutter 9 includes a first and a second transparent substrates 91a and 91b arranged to face each other. Between the first and the second transparent substrate 91a and 91b, a rib spacer 97A is provided to locate at the periphery of the substrates. The rib spacer 97A, along with the first and the second transparent substrates 91a and 91b, defines a cell 96 for loading liquid crystal 90. The rib spacer 97a defines the height of the cell 96, i.e., the cell gap. In addition to the liquid crystal 90, spherical spacers 97b are filled in the cell 96. The spherical spacers 97b serve to stabilize the cell gap defined by the rib spacer 97a.

The first transparent substrate 91a has a surface facing the second transparent substrate 91b and formed with a first transparent electrode 93a via an $SiO_2$ film 92a. The $SiO_2$ film 92a serves to enhance the adhesion of the first transparent electrode 93a to the first transparent substrate 91a. The first transparent electrode 93a is formed into an intended pattern by forming an ITO film and then etching the ITO film, for example.

The second transparent substrate 91b has a surface facing the first transparent substrate 91a and formed with a metal light-shielding film 94 having an opening 94a. The metal light-shielding film 94 allows light to pass selectively at the opening 94a. In the opening 94a are arranged color filters 98R, 98G and 98B for selectively passing red light, green light and blue light, respectively. The second transparent substrate 91b is further formed with a smoothing film 95 covering the color filters 98R, 98G and 98B, an $SiO_2$ film 92b and a second transparent electrode 93b.

The smoothing film 95 serves to compensate for a step formed by the provision of the color filters 98R, 98G, 98B for providing a smooth surface. The $SiO_2$ film 92b serves to enhance the adhesion of the second transparent electrode 93b to the smoothing film 95. The second transparent electrode 93b partially overlaps the first transparent electrode 93a, and the overlapping portions constitute individual shutter portions 90R, 90B and 90B. Similarly to the first transparent electrode 93a, the second transparent electrodes 93b is formed into an intended pattern by forming an ITO film and then etching the ITO film, for example.

The second transparent substrate 91b is made larger in dimension than the first transparent substrate 92a. The second transparent electrode 93b extends over the second transparent substrate 92b up to a portion projecting outward relative to the first transparent substrate 92a. On the second transparent substrate 91b, a drive IC 99a is mounted for electrical connection to the second transparent electrode 92b. The drive IC 99a is connected to a flexible cable 99b via a signal electrode 99c.

The liquid crystal shutter 9 has the following disadvantages due to the provision of the smoothing film 95 for covering the color filters 98R, 98G, 98B.

The smoothing film 95 is generally made of transparent resin and relatively soft. Therefore, spherical spacers 97b dispersed in the liquid crystal 90 may sink into the smoothing film 95 through the second transparent electrode 93b and the $SiO_2$ film 92b. Such a phenomenon may occur at some locations in the cell 96, and the cell gap reduces at the locations where the spherical spacers 97b have sunk. Therefore, even when the same voltage is applied, the resulting electric field strength varies between a portion where the intended cell gap is maintained and a portion where the cell gap is reduced. As a result, the transmittance varies among the individual shutter portions 90R, 90G, 90B. The spherical spacers 97b are not dispersed evenly in the liquid crystal 90, and such unevenness of dispersion increases the variation of transmittance.

To achieve high-speed printing, the cell gap need be made relatively small for the purpose of driving the liquid crystal shutter 9 at high speed. However, when the cell gap is small, the influence of the unevenness of the cell gap due to the sinking of the spherical spacers 97b in the smoothing film 95 becomes relatively large. Therefore, in the liquid crystal shutter 9 having a relatively small cell gap, the variation of transmittance is large. In this point, the provision of the smoothing film 95 hinders the achievement of high speed printing.

Although the adhesion of the second transparent electrode 93b to the smoothing film 95 is enhanced by the $SiO_2$ film 92b, the adhesion between the $SiO_2$ film 92b and the smoothing film 95 is insufficient. Therefore, overetching is likely to occur in the etching process for forming the second transparent electrode 93b, so that the second transparent electrode 93b may become smaller than the intended pattern. In this case, the size of the individual shutter portions 90R, 90G, 90B differs between a portion where overetching has occurred and a portion where overetching has not occurred. At the individual shutter portion 90R, 90G, 90B corresponding to the portion where overetching has occurred, the numerical aperture becomes smaller, whereby the transmission efficiency at the shutter portion is reduced.

To reliably eliminate the step caused by the color filters 98R, 98G, 98B, the smoothing film 95 needs to have a relatively large thickness. In this case, a large amount of light is absorbed by the smoothing film 95, which further deteriorates the transmission efficiency.

To compensate for the deterioration of the transmission efficiency and to reliably irradiate the photosensitive film with a sufficient amount of light, the amount of light to be emitted from the illuminator need be increased, or the irradiation time for the photosensitive film need be increased. However, such measures are disadvantageous in terms of the running cost, and the increase of the irradiation time leads to the increase of the printing time.

Moreover, since the adhesion between the $SiO_2$ film 92b and the smoothing film 95 is insufficient, when a stress is exerted on the interface between these films, the second transparent electrode 93b or the signal electrode 99c may be removed from the smoothing film 95 together with the $SiO_2$ film 92b. Therefore, the mounting reliability of the drive IC 99a and the flexible cable 99b is deteriorated. In some cases, the mount surface of the second transparent electrode 93b or the signal electrode 99c may be physically rubbed for cleaning before mounting the drive IC 99a or the flexible cable 99b, or the drive IC 99a or the flexible cable 99b may be once removed for remounting. At that time, the second transparent electrode 93b or the signal electrode 99c may be removed, which hinders the mounting of the drive IC 99a or the flexible cable 99b.

To solve the above problem, the smoothing film 95 should not be provided between the second transparent substrate 91b and the $SiO_2$ film 92b at portions where the drive IC 99a and the flexible cable 99b are to be mounted. For this purpose, however, a patterning process to select the portions to form the smoothing film 95 need be added to the smoothing film formation step, which deteriorates the manufacturing efficiency and is disadvantageous in terms of the manufacturing cost.

DISCLOSURE OF THE INVENTION

An object of the present invention is to provide a liquid crystal shutter which is used for e.g. a printhead for irradiating a photosensitive recording medium with light and is capable of preventing the amount of light emission from varying among shutter portions and reducing the manufacturing cost and the running cost without hindering the achievement of high speed printing.

According to a first aspect of the present invention, there is provided a liquid crystal shutter comprising: a first and a second transparent substrates arranged to face each other; a light shielding film formed on a surface of the second transparent substrate facing the first transparent substrate for restricting incidence of light travelling from the first transparent substrate to the second transparent substrate; and a transparent electrode laminated over the light shielding film via a single insulating layer.

According to a second aspect of the present invention, there is provided a liquid crystal shutter comprising: a first and a second transparent substrates arranged to face each other; a light shielding film formed on a surface of the second transparent substrate facing the first transparent substrate for restricting incidence of light travelling from the first transparent substrate to the second transparent substrate; and a transparent electrode laminated over the light shielding film via a single insulating layer. Each of the transparent electrode, the light shielding film and the insulating layer is made of an inorganic substance.

The insulating layer may be made of an inorganic oxide, for example. As the inorganic oxide, it is preferable to use $SiO_2$ or $Ta_2O_5$.

The insulating layer may have a thickness of no more than 2000 Å or preferably in the range of 1000 to 2000 Å, for example.

The method for forming the insulating layer is not limitative, and any method can be employed as long as it can suppress the thickness of the insulating layer to no more than 2000 Å. However, it is preferable to employ dip coating, bias sputtering or plasma CVD.

For instance, the light shielding film is made of a metal. As the metal, use may be made of chromium, molybdenum, tungsten, nickel, germanium, gold or aluminum. Preferably, the obverse surface of the light shielding film is made of a highly light absorbent material such as chromium oxide, for example.

The light shielding film may be formed with an opening for selectively allowing incidence of light passing through the first transparent substrate onto the second transparent substrate. Preferably, the opening has a tapered edge. Examples of technique for tapering the edge of the opening include liftoff and taper etching.

The light shielding film may have a thickness of no more than 3000 Å or preferably in the range of 2000 to 3000 Å, for example. Since the light shielding film is formed as a thin film having a thickness of no more than 3000 Å, the formation of the opening in the light shielding film does not cause the formation of a large step between the periphery of the opening and the surrounding portion. Moreover, since the edge of the opening is tapered, good step coverage can be obtained by covering the light shielding film by the insulating layer.

According to a third aspect of the present invention, there is provided a printhead provided with a liquid crystal shutter. The liquid crystal shutter comprises: a first and a second transparent substrates arranged to face each other; a light shielding film formed on a surface of the second transparent substrate facing the first transparent substrate for restricting incidence of light travelling from the first transparent substrate to the second transparent substrate; and a transparent electrode laminated over the light shielding film via a single insulating layer.

According to a fourth aspect of the present invention, there is provided a printhead provided with a liquid crystal shutter. The liquid crystal shutter comprises: a first and a second transparent substrates arranged to face each other; a light shielding film formed on a surface of the second transparent substrate facing the first transparent substrate for restricting incidence of light travelling from the first transparent substrate to the second transparent substrate; and a transparent electrode laminated over the light shielding film via an insulating layer. Each of the transparent electrode, the light shielding film and the insulating layer are made of an inorganic substance.

Preferably, the printhead according to the present invention further comprises an illuminator capable of individually emitting red light, green light and blue light. With this structure, a liquid crystal shutter which does not include a color filter can be used. As a result, a smoothing film for reducing the step formed by the provision of a color filter need not be formed.

BRIEF DESCRIPTION OF THE DRAWINGS

FIG. 8 is a plan view showing a principal portion of the prior art liquid crystal shutter.

DETAILED DESCRIPTION OF THE PREFERRED EMBODIMENTS

Figure 1:
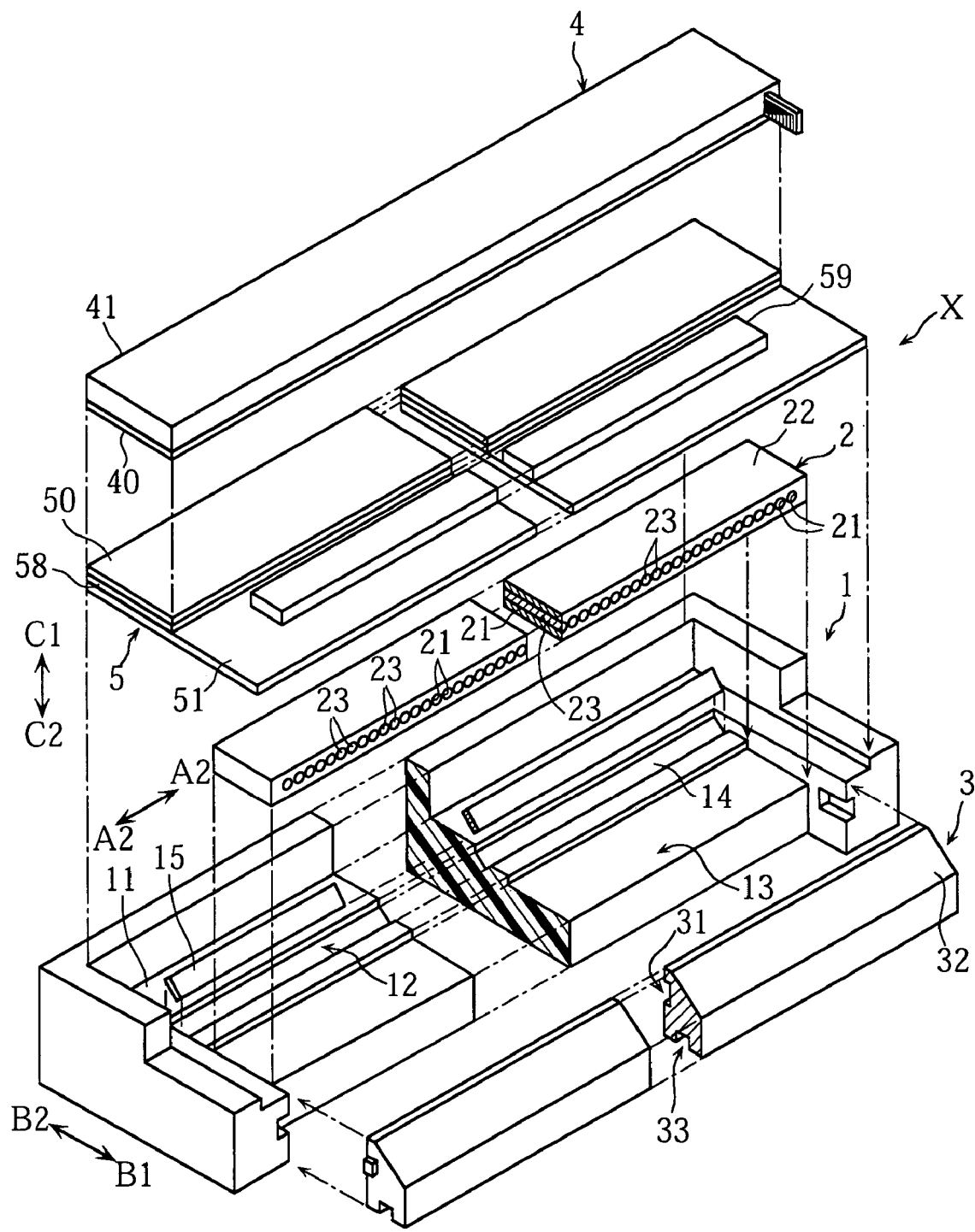
FIG. 1 is an exploded perspective view showing an example of printhead according to the present invention.
Figure 2:
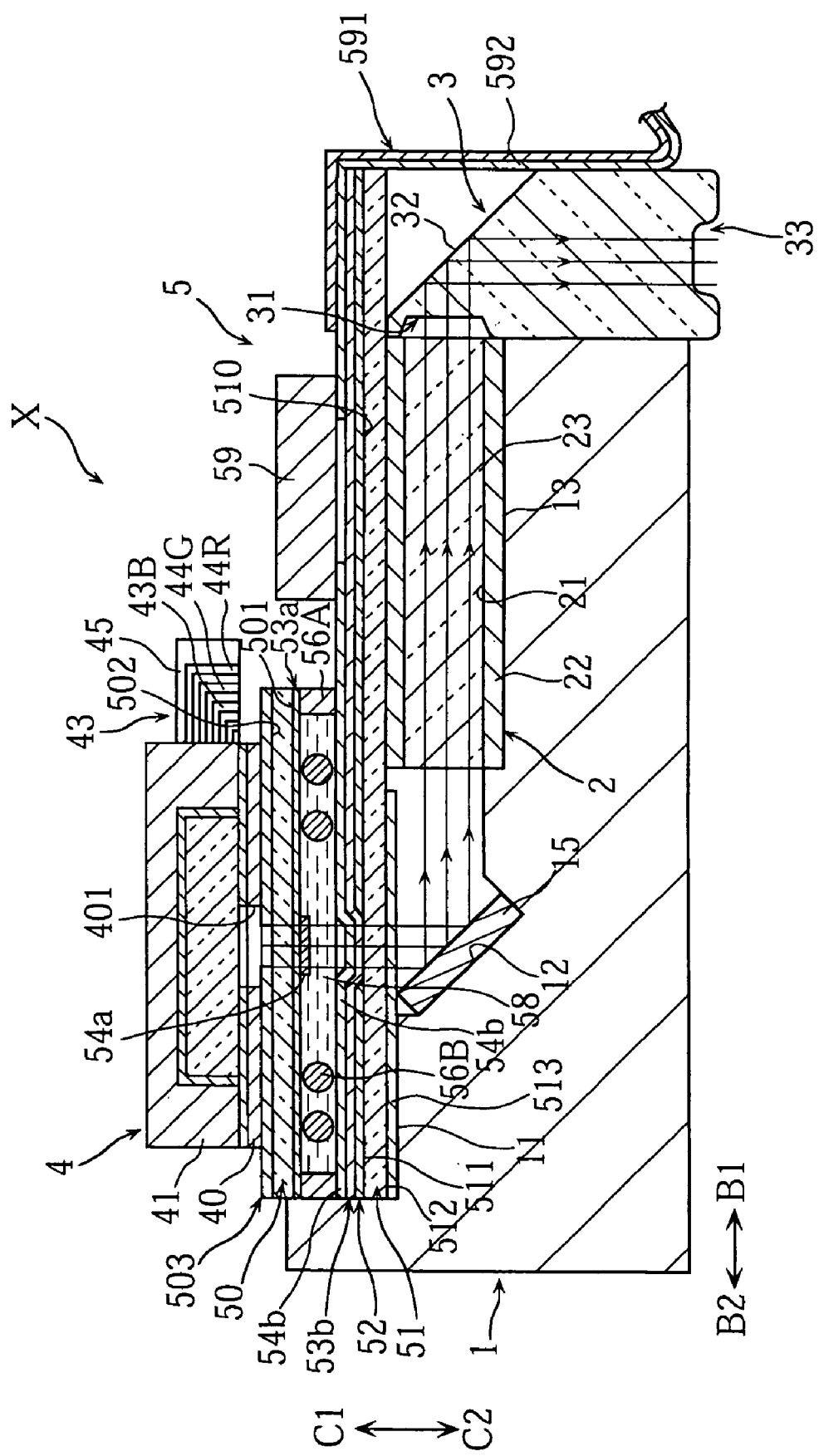
FIG. 2 is a sectional view of the printhead shown in FIG. 1.

A printhead X shown in FIGS. 1 and 2 includes a frame 1 comprising a first through a fourth holder portions 10–13, and a rod lens array 2, a prism 3, an illuminator 4 and a liquid crystal shutter 5 which are held by the frame.

The first holder portion 10 of the frame 1 serves to hold the illuminator 4 along with the liquid crystal shutter 5 and has a channel-like mount surface 10a. The liquid crystal shutter 5 is mounted on the mount surface 10a in close contact therewith.

The second holder portion 11 of the frame 1 serves to hold a reflector 15 and has an inclined surface 14 inclined relative to the direction indicated by arrows B1, B2 (horizontal direction) by 45 degrees. The inclined surface 14 is elongated in the direction indicated by arrows A1, A2 (primary scanning direction).

The reflector 15, which is in the form of a plate, serves to bend the light emitted from the liquid crystal shutter 5 by 90 degrees toward the direction indicated by the arrow B1 (secondary scanning direction) in the figure. Preferably, the obverse surface of the reflector 15 is a mirror surface made of e.g. aluminum for regularly reflecting light.

The third holder portion 12 of the frame 1 serves to hold the rod lens array 2.

The rod lens array 2 serves to efficiently collect the light reflected at the reflector 15 for emitting the light toward the prism 3. The rod lens array 2 comprises a holder 22 formed with a plurality of through-holes 21 and rod lenses 23 each held in a respective through-hole 21. The rod lenses 23 are arranged in a row extending in the primary scanning direction A1, A2, with the axis of each rod lens 23 extending in the direction indicated by the arrows B1, B2 (secondary scanning direction) in the figure. In this embodiment, the rod lenses 13 form an actual size erect image.

The fourth holder portion 13 of the frame 1 serves to hold the prism 3 and is open toward the B1 direction in the figure.

The prism 3 serves to bend the light emitted from the rod lens array 2 by 90 degrees toward the direction indicated by the arrow C2, causing the light to be emitted from the printhead X in the C2 direction. The prism 3 includes a light incident surface 31, a light reflecting surface 32 and a light emitting surface 33. Thus, the light from the reflector 15 enters the prism 3 through the light incident surface 31 and is then reflected at the light reflecting surface 32 to change its traveling direction by 90 degrees. Thereafter, the light is emitted through the light emitting surface 33. The prism 3 is made of a material having a refractive index higher than that of air, such as transparent glass or acrylic resin.

Figure 3:
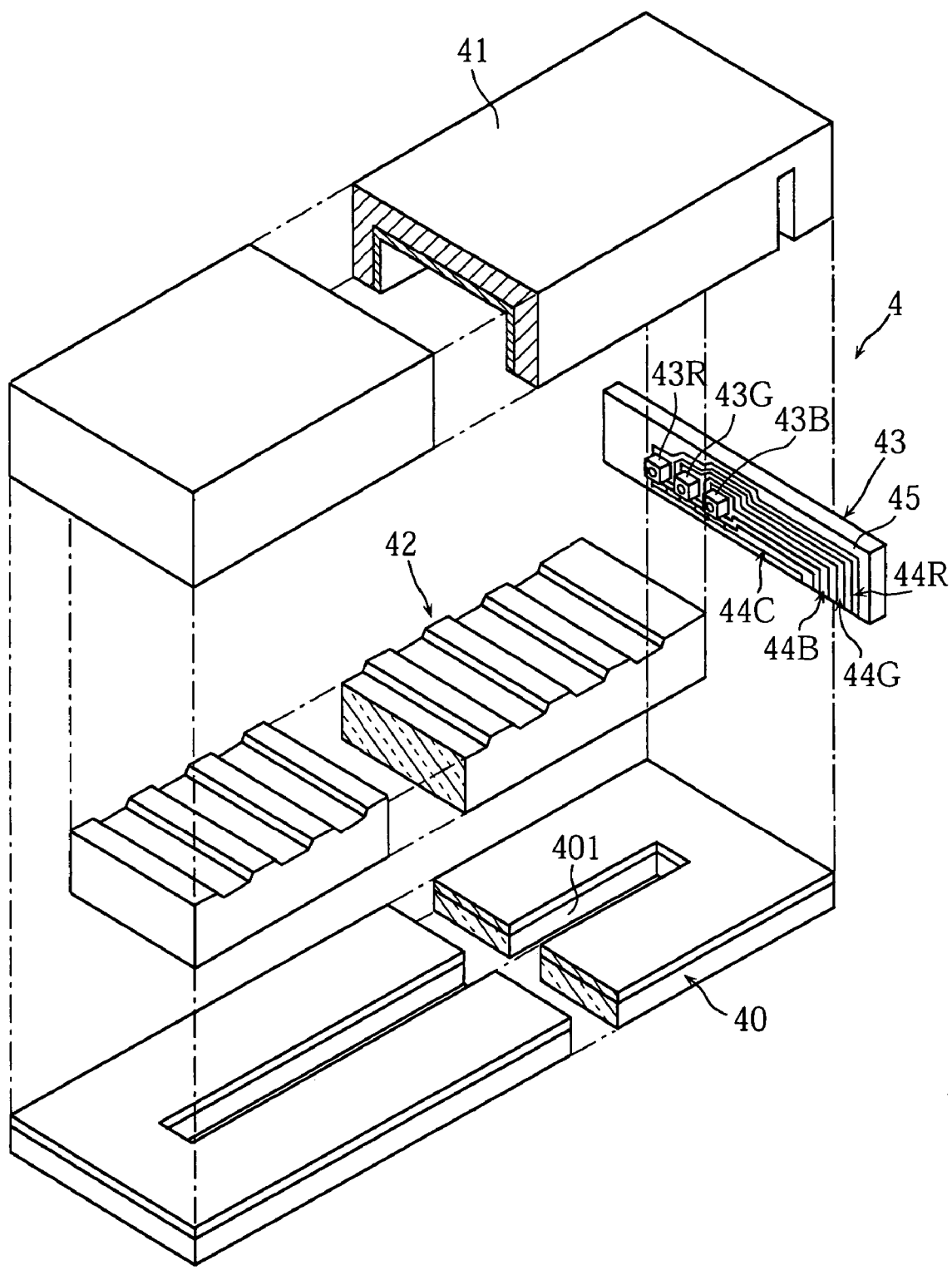
FIG. 3 is an exploded perspective view of an illuminator used in the printhead shown in FIG. 1.

The illuminator 4 serves to emit linear light in the direction indicated by the arrow C1, C2 in the figure and is held in close contact with the liquid crystal shutter 5. As clearly shown in FIGS. 2 and 3, the illuminator 4 includes a light guide 42 and a light source device 43 which are arranged in a space defined by a first and a second light shields 40, 41. In the illuminator 4, the light emitted from the light source device 43 passes through the light guide 42 and is then emitted outside through an opening 401 formed in the first light shield 40.

The light source device 43 includes three point light sources 43R, 43G and 43B which are mounted on an insulating substrate 45 and which can be turned on and off individually. The point light sources 43R, 43G and 43B comprise LED chips. The point light source 43R emits red light, the point light source 43G emits green light and the point light source 43B emits blue light. Each of the point light sources 43R, 43G and 43B has an upper surface and a lower surface respectively formed with electrodes (not shown). The upper electrode is a transparent electrode made of ITO, for example.

The insulating substrate 45 is formed with individual wirings 44R, 44G and 44B, and a common wiring 44C. The lower electrodes of the point light sources 43R, 43G and 43B are electrically connected to the individual wirings 44R, 44G and 44B. The upper electrodes of the point light sources 43R, 43G and 43B are connected to the common wiring 44C via conductor wires, for example. With such a circuit structure, the point light sources 43R, 43G and 43B can be driven individually.

The light guide 42 serves to cause the light emitted from the light source device 43 and entered the light guide through an end surface thereof to be emitted as linear light corresponding to the configuration of the opening 401 formed in the first light shield 40.

Figure 4:
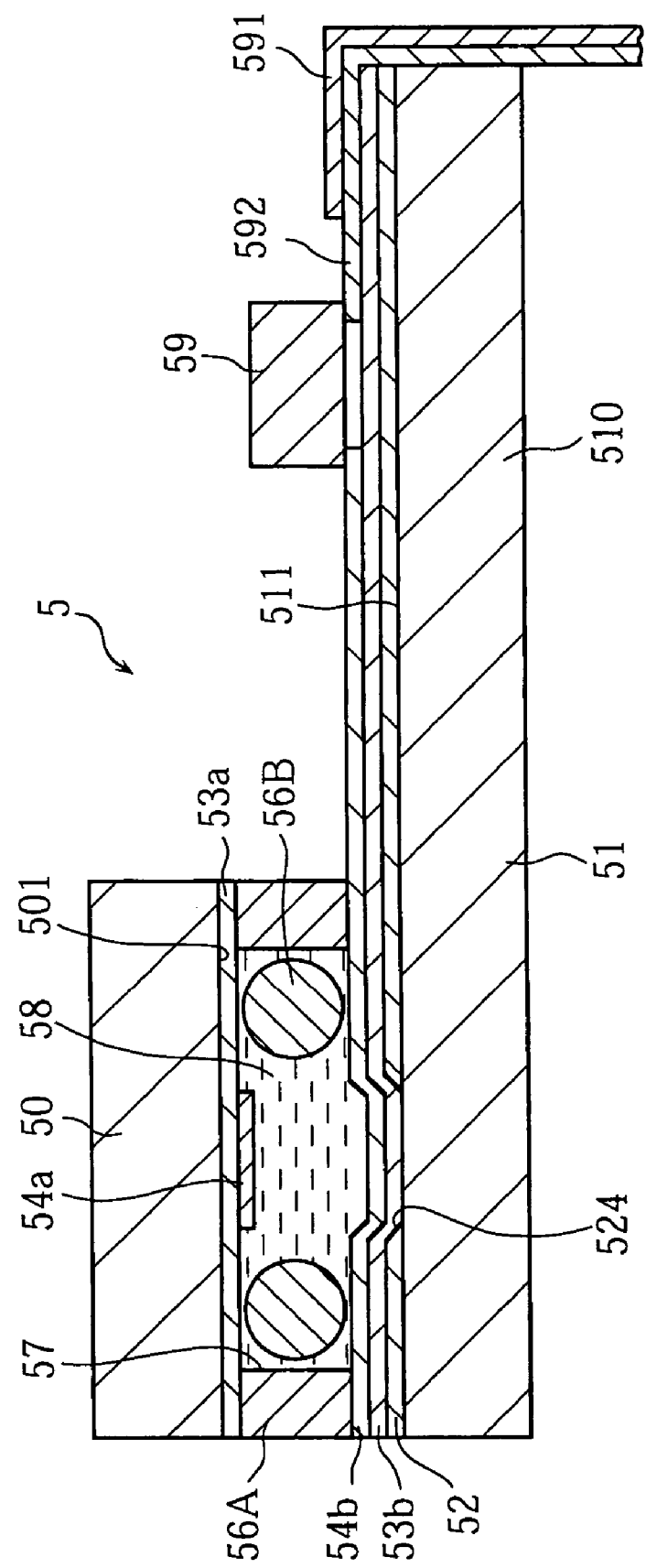
FIG. 4 is a sectional view of a liquid crystal shutter according to the present invention.

As clearly shown in FIG. 4, the liquid crystal shutter 5, which serves to select the passing or blocking of the light emitted from the illuminator 4, includes a first and a second transparent substrates 50 and 51 arranged to face each other.

The first transparent substrate 50 has a facing surface 501 which faces the second transparent substrate 51 and which is formed with an insulating layer 53a. The insulating layer 53a is light permeable and may be made of $SiO_2$ or $Ta_2O_5$ by dip coating, bias sputtering or plasma CVD, for example. The facing surface 501 of the first transparent substrate 50 is further formed with a common electrode 54a. The common electrode 54a is formed as a transparent electrode in the form of a strip extending in the direction indicated by the arrows A1, A2. The common electrode 54a may be made by subjecting an ITO film to etching.

The second transparent substrate 51 is larger in dimension than the first transparent substrate and includes an extension 510 extending outward relative to the first transparent substrate 50 in the direction indicated by the arrow B1. The second transparent substrate 51 has a region 511 oriented toward the first transparent substrate 50 and formed with a light shielding film 52.

Figure 5:
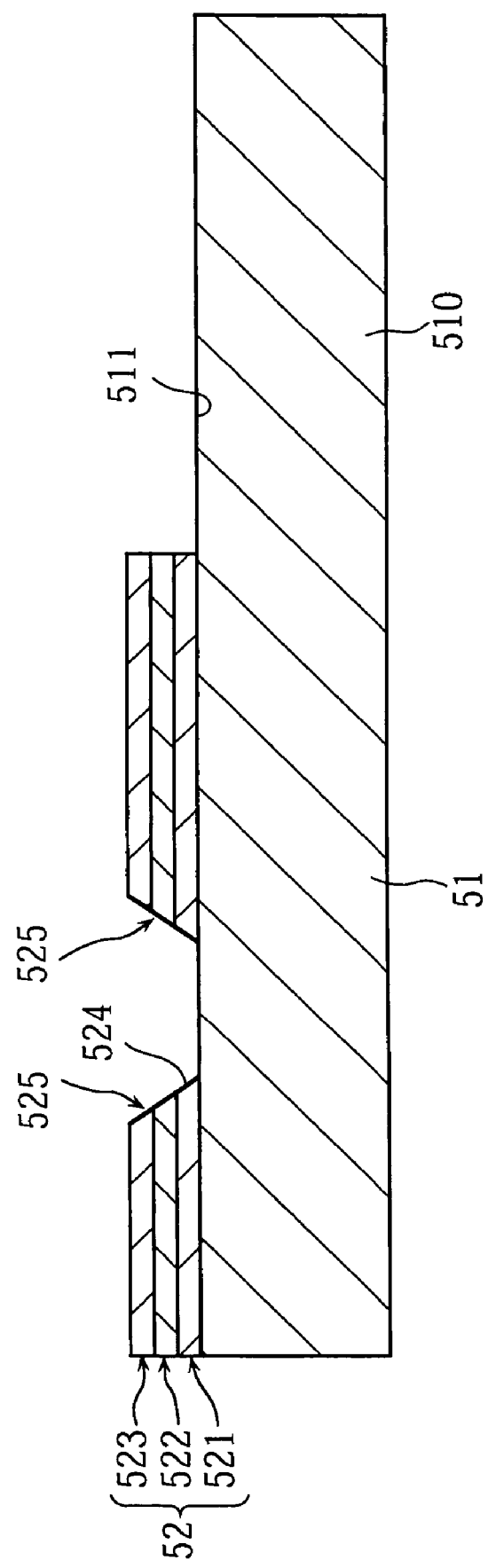
FIG. 5 is a partial sectional view for describing the structure of the light shielding film of the liquid crystal shutter.
Figure 6:
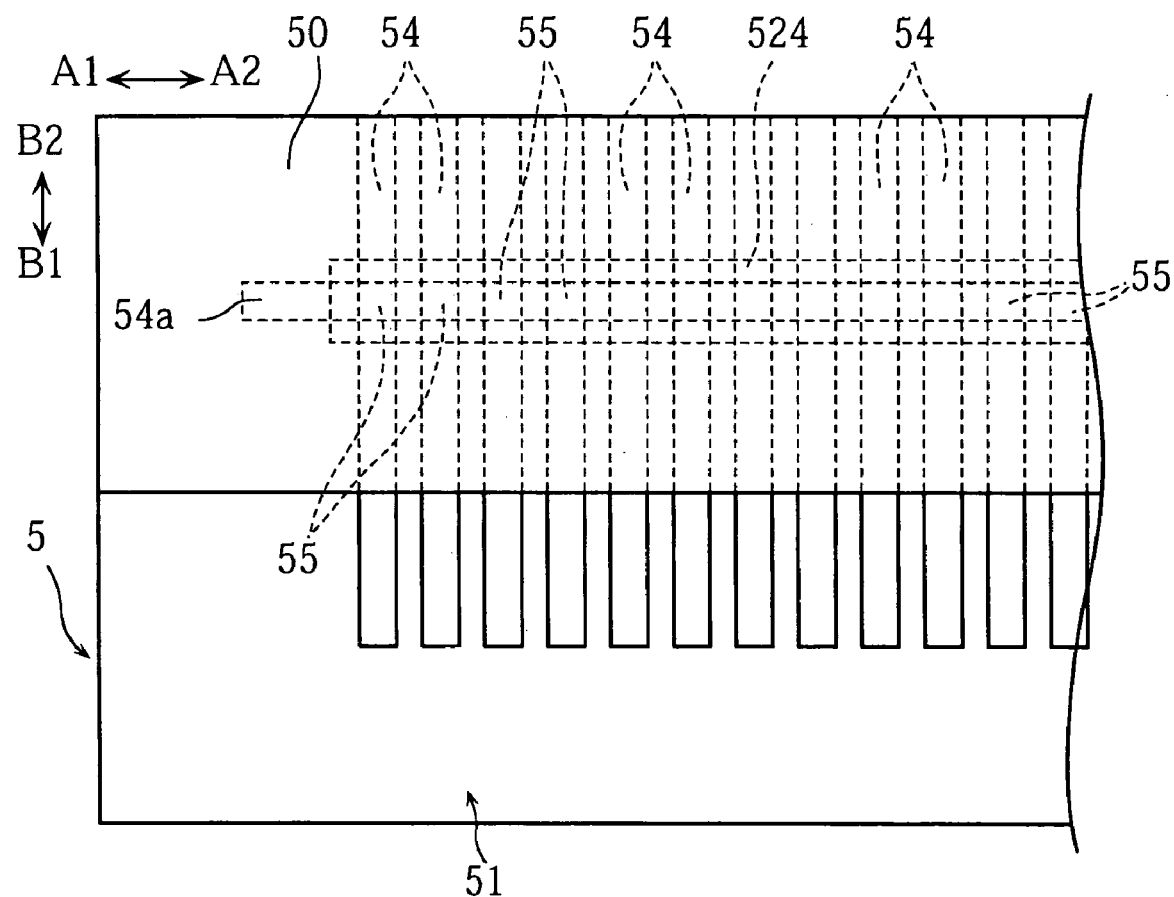
FIG. 6 is a plan view showing a principal portion of the liquid crystal shutter.

The light shielding film 52 is a thin film having a thickness of no more than 3000 Å or preferably in the range of 2000 to 3000 Å, for example. As shown in FIGS. 4 through 6, the light shielding film 52 is formed with an opening 524 extending in the direction indicated by the arrows A1, A2. The opening 524 is formed at a location corresponding to the opening 401 of the first light shield 40 of the illuminator 4. The opening 524 of the light shielding film 52 has tapered edges 525. The edges 525 may be formed by techniques such as liftoff or taper etching, for example. The light shielding film 52 has a three-layer structure consisting of a chromium oxide layer 521, a chromium layer 522, and a chromium oxide layer 523 stacked in the mentioned order on the region 511 of the second transparent substrate 51, for example. Each of the layers 521, 522 and 523 may be formed by techniques such as vapor deposition or sputtering, for example.

The light shielding film 52 may be made of a metal other than chromium and chromium oxide. Examples of usable metal include molybdenum, tungsten, nickel, germanium, gold and aluminum. Instead of the above metal, the light shielding film 52 may be made of an inorganic substance having a light shielding property.

On the light shielding film 52 is formed an insulating layer 53b. The insulating layer 53b is a light permeable thin film made of an inorganic oxide such as $SiO_2$ or $Ta_2O_5$ and having a thickness of no more than 2000 Å or preferably in the range of 1000 to 2000 Å, for example. The light shielding film 52 may be made by dip coating, bias sputtering or plasma CVD, for example.

As noted above, the light shielding film 52 is a thin film having a thickness of no more than 3000 Å, and the edges 525 of the opening 524 are tapered. Therefore, although the opening 524 is provided in the light shielding film 52, a large step is not formed between the opening 524 and the peripheral portion even when the thickness of the insulating layer 53b is small. Therefore, good step coverage by the insulating layer 53b relative to the light shielding film 52 can be obtained even when the film thickness of the insulating layer 53b is set to the above-described range.

On the insulating layer 53b, a plurality of segment electrodes 54b as transparent electrodes are formed. The segment electrodes 54b are spaced in the direction indicated by the arrows A1, A2. The segment electrodes 54b may be formed by subjecting an ITO film to etching, for example. As shown in FIG. 6, each of the segment electrodes 54b has a portion which overlaps the common electrode 54a. The portions where the common electrode 54a and the segment electrode 54b overlap each other constitute individual shutter portions 55. The individual shutter portions 55 are located directly below the opening 401 of the first light shield 40 and arranged in a row extending in the direction indicated by the arrows A1, A2.

In the liquid crystal shutter 5, good step coverage can be achieved, with the thickness of the insulating layer 53b set to no more than 2000 Å. Therefore, in the liquid crystal shutter 5, the absorption of light by the insulating layer 53b can be suppressed, whereby the deterioration of light transmittance can be prevented.

Figure 7:
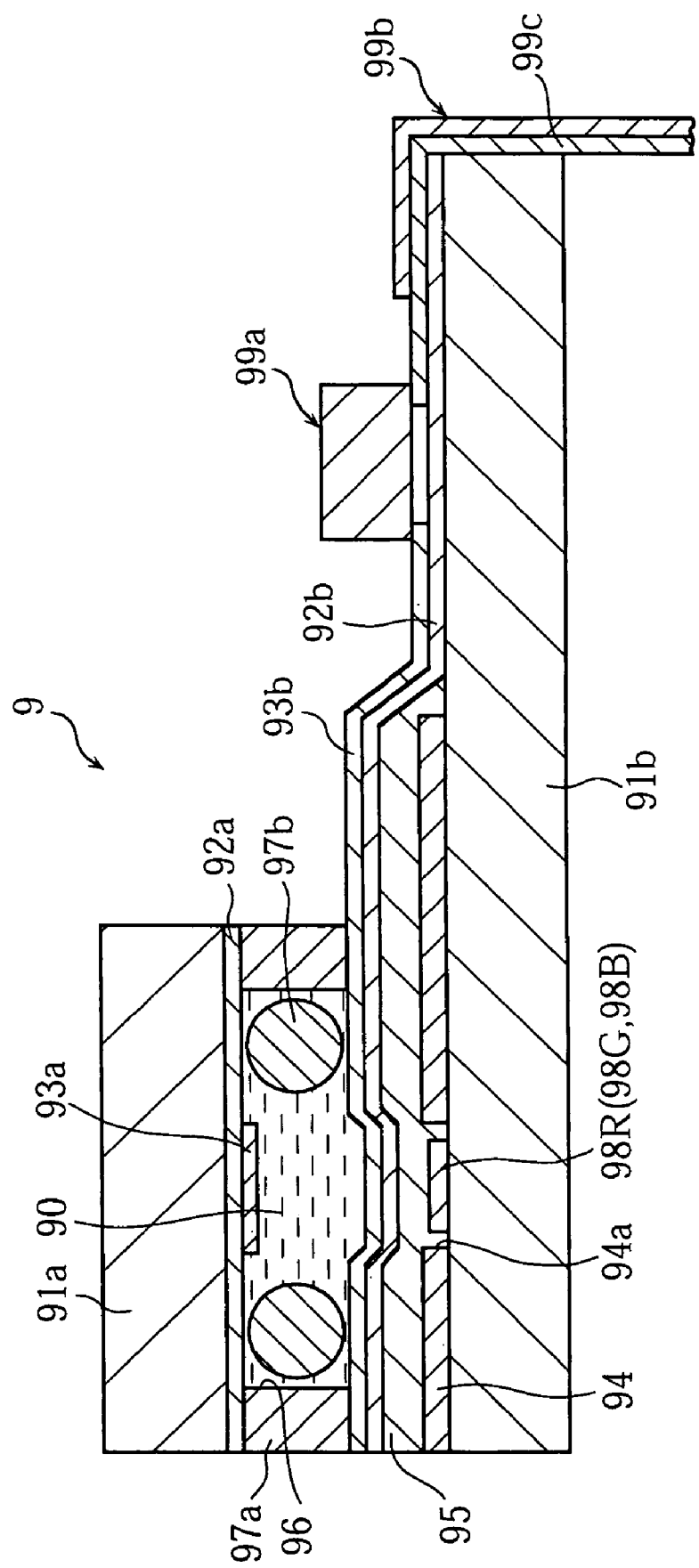
FIG. 7 is a sectional view showing a prior art liquid crystal shutter.

Further, since the segment electrodes 54b, the insulating layer 53b and the light shielding film 52 are made of an inorganic substance, a higher adhesion is provided between the segment electrodes 54b and the light shielding film 52 than when a smoothing film made of a resin is used as is in the prior art liquid crystal shutter (See FIGS. 7 and 8). Therefore, the segment electrodes 54b are unlikely to be removed from the light shielding film 52, whereby overetching in the etching process for forming the segment electrodes 54b can be prevented. Therefore, the shutter portions 55 can be made generally equal in size, so that variation of light transmittance and the decrease of the numerical aperture due to variation of the size of the individual shutter portions 55 can be prevented. As a result, it is possible to suppress the deterioration of transmission efficiency at each shutter portion 55 and the variation of transmittance among the shutter portions 55.

Moreover, unlike the prior art liquid crystal shutter (See FIGS. 7 and 8), the liquid crystal shutter 5 does not include a smoothing film, so that the absorption of light by a smoothing film does not occur. This also contributes to the enhancement of transmission efficiency in the liquid crystal shutter 5, and hence to the reduction of power consumption of the liquid crystal shutter 5 (printhead X). As a result, in the liquid crystal shutter 5 (printhead X), the running cost can be decreased, or the irradiation time by the illuminator 4 can be shortened, which enables the achievement of high speed printing.

Between the first and the second transparent substrates 50 and 51, a rib spacer 56A is provided to locate at the periphery of the substrates. The rib spacer 56A, along with the first and the second transparent substrates 50, 51, defines a cell 57. Specifically, the rib spacer 56A defines the height of the cell (cell gap). Liquid crystal 58 and spherical spacers 56B are filled in the cell 57. As the liquid crystal 58, use may be made of ferroelectric liquid crystal, antiferroelectric liquid crystal or nematic crystal. When nematic crystal is used as the liquid crystal, an alignment layer is provided to cover the common electrode 54a and the segment electrodes 43b.

As shown in FIG. 2, the first transparent substrate 50 and the second transparent substrates 51 have respective non-facing surfaces 502 and 512 provided with polarizers 503 and 513. The polarizers 503 and 513 are so arranged that respective polarization axes extend perpendicularly to each other. For example, therefore, the light passing through the polarizer 503 and through the liquid crystal 58 changes its polarization direction by 90 degrees at a shutter portion 55 to which a voltage no less than a threshold is applied, so that the light can pass through the polarizer 513. On the other hand, the polarization direction of the light does not change at a shutter portion 55 to which small (or no) voltage is applied, so that the light cannot pass through the polarizer 513. Thus, the selection of light passing or light blocking can be performed with respect to each of the individual shutter portions 55 by controlling the voltage application to the individual shutter portions 55.

As shown in FIG. 4, a drive IC 59 is mounted on the extension 510 of the second transparent substrate 51. The drive IC 59 is electrically connected to the segment electrodes 54b. The drive IC 59 is also connected to a flexible cable 591 formed with a signal electrode 592. Thus, power supply or transmission of various signals to the drive IC 59 is performed through the flexible cable 591 (signal electrode 592), and the state of voltage application can be selected with respect to each of the individual shutter portions 55.

As noted above, in the liquid crystal shutter 5, a smoothing film made of a resin is not interposed between the light shielding film 52 and the insulating layer 53b, and the light shielding film 52, the insulating layer 53b and the segment electrodes 54b are made of an inorganic substance. Therefore, a high adhesion can be provided between the light shielding film 52 and the segment electrodes 54b or the signal electrode 592. As a result, the drive IC 59 and the flexible cable 591 can be reliably mounted on the second transparent substrate 51. The mount surface of the segment electrode 54b or the signal electrode 592 may be physically rubbed for cleaning before mounting the drive IC 59 or the flexible cable 591, or the drive IC 59 or the flexible cable 591 may be once removed for remounting. Even in such cases, the segment electrode 54b and the signal electrode 592 can be prevented from being removed. Therefore, the drive IC 59 and the flexible cable 591 are not wasted, which enhances the yield.

Since the liquid crystal shutter 5 does not include a smoothing film, the process for forming a smoothing film is not necessary in manufacturing the liquid crystal shutter. Specifically, the process for selectively forming a smoothing film at intended portions, which is conventionally necessary for reliable mounting of the drive IC 59 and the flexible cable 591, is not necessary. Therefore, the liquid crystal shutter 5 having improved mounting reliability can be made with high production efficiency.

The above-described printhead X may be used for exposing a photosensitive film to form an image on the photosensitive film. In such a case, the point light emitted from the light source device 43 of the illuminator 4 is converted into linear light at the light guide 42 and then travels through the opening 401 of the first light shield 40 before entering the liquid crystal shutter 5. In the liquid crystal shutter 5, under the control by the drive IC 59, light transmitting or light blocking at each of the individual shutter portions 55 (See FIG. 6) is selected based on the image data. The light passing through the individual shutter portion 55 is regularly reflected by the reflector 15, thereby changing its traveling direction by 90 degrees before entering the rod lens array 2. The light entering the rod lens array 21 pass through each rod lens 23 and then enters the prism 3 through the light incident surface 31. The light entering the prism 3 changes its traveling direction by 90 degrees at the light reflecting surface 32 and travels downward in the prism 3 before exiting through the light emitting surface 33. The light is converged onto e.g. a photosensitive film to irradiate the photosensitive film along a line.

As noted above, the printhead X is provided with the illuminator 4 capable of individually emitting red light, green light and blue light. Therefore, the liquid crystal shutter 5 does not require a conventionally used color filter. Accordingly, a smoothing film for reducing the step caused by the provision of a color filter need not be positively formed, and the elimination of a smoothing film causes no problems. The elimination of a smoothing film makes it possible to avoid such a problem that the spherical spacers 56B sink into the smoothing film at some locations in the cell 57. As a result, variation of the cell gap among locations in the cell 57 can be prevented. Since such variation of the cell gap is prevented, variation of the electric field strength among individual shutter portions 55 can be prevented when the same voltage is applied to each of the shutter portions 55. As a result, variation of the light transmittance among the shutter portions 55 can be prevented. Moreover, since variation of the cell gap is prevented, variation of the light transmittance can be prevented even when the cell gap is made small for the purpose of driving the liquid crystal shutter 5 at high speed. Therefore, high-speed printing capable of obtaining a high-quality image can be realized.

In the present invention, the insulating layer 53b may be made of an inorganic oxide to have a relatively high rigidity. In such a case, the spherical spacers 56B can be prevented from sinking into the insulating layer 53b at some locations in the cell 57. This also prevents variation of the cell gap and hence the variation of the light transmittance, thereby enabling high-speed printing.

The printhead X can be used for black-and-white printing by changing the structure of the light source device 43.

The present invention is not limited to the foregoing embodiment, and the liquid crystal shutter 5 can be used for purposes other than a printhead.

The invention claimed is:

1. A liquid crystal shutter comprising:
   first and second transparent substrates arranged to fare each other;
   a light shielding film formed on a surface of the second transparent substrate facing the first transparent substrate for restricting incidence of light traveling from the first transparent substrate to the second transparent substrate; and
   a transparent electrode laminated over the light shielding film via a single insulating layer;
   wherein the insulating layer is made of an inorganic oxide, and
   wherein the light shielding film comprises a metal layer and a surface layer made of a metal oxide, the surface layer of the light shielding film being held in contact with the insulating layer.

2. The liquid crystal shutter according to claim 1, wherein the inorganic oxide is $SiO_2$ or $Ta_2O_5$.

3. The liquid crystal shutter according to claim 1, wherein the insulating layer has a thickness of no more than 2000 Å.

4. The liquid crystal shutter according to claim 1, wherein the insulating layer is made by a method selected from the group consisting of dip coating, bias sputtering and plasma CVD.

5. The liquid crystal shutter according to claim 1, wherein the metal layer of the light shielding film is made of chromium.

6. The liquid crystal shutter according to claim 5, wherein the surface layer of the light shielding film is made of chromium oxide.

7. The liquid crystal shutter according to claim 1, wherein the light shielding film is formed with an opening for selectively allowing incidence of light passing through the first transparent substrate onto the second transparent substrate; and
   wherein the opening has a tapered edge.

8. The liquid crystal shutter according to claim 7, wherein the light shielding film has a thickness of no more than 3000 Å.

9. A printhead provided with a liquid crystal shutter, the printhead comprising:
   first and second transparent substrates arranged to face each other;
   a light shielding film formed on a surface of the second transparent substrate facing the first transparent substrate for restricting incidence of light traveling from the first transparent substrate to the second transparent substrate; and
   a transparent electrode laminated over the light shielding film via a single insulating layer;
   wherein the insulating layer is made of an inorganic oxide, and
   wherein the light shielding film comprises a metal layer and a surface layer made of a metal oxide, the surface layer of the light shielding film being held in contact with the insulating layer.

10. The printhead according to claim 9, further comprising an illuminator capable of individually emitting red light, green light and blue light.

* * * * *